Nov. 28, 1944.  A. A. KUCHER  2,363,977
MOTOR VEHICLE
Filed June 14, 1943  2 Sheets-Sheet 1

INVENTOR.
ANDREW A. KUCHER
BY
*O. H. Fowler*
ATTORNEY.

Nov. 28, 1944.  A. A. KUCHER  2,363,977
MOTOR VEHICLE
Filed June 14, 1943  2 Sheets-Sheet 2

INVENTOR.
ANDREW A. KUCHER
BY
ATTORNEY.

Patented Nov. 28, 1944

2,363,977

UNITED STATES PATENT OFFICE 2,363,977

MOTOR VEHICLE

Andrew A. Kucher, Grosse Pointe Farms, Mich., assignor to Bendix Aviation Corporation, Detroit, Mich., a corporation of Delaware Application June 14, 1943, Serial No. 490,801

10 Claims. (Cl. 180—53)

This invention relates to motor vehicles, and more particularly to a motor vehicle having a hydraulic drive and an auxiliary mechanism (such as an air-conditioning system, a hydraulic steering gear, or a brake system) operated by power from said drive.

An object of the invention is to provide a simple and effective arrangement for operating such a mechanism by liquid under pressure supplied from the hydraulic drive and then returning the used liquid to the drive, without interfering with the operation of the liquid in the drive itself.

A further object is to utilize in this manner liquid from a hydraulic drive device of the Fottinger type; i. e., a drive device in which an operating liquid is driven centrifugally in a toroidal path, and preferably from a hydraulic torque converter of this type.

In view of the rapid and considerable variation in the hydraulic pressures in a fluid drive device of this type, another important object is to render the auxiliary mechanism continuously effective by means of a hydraulic accumulator into which liquid is forced past a check valve or the equivalent from the high-pressure zone at the periphery of the drive device, at times when the pressure in that zone is above the pressure in the accumulator.

Figure 1:
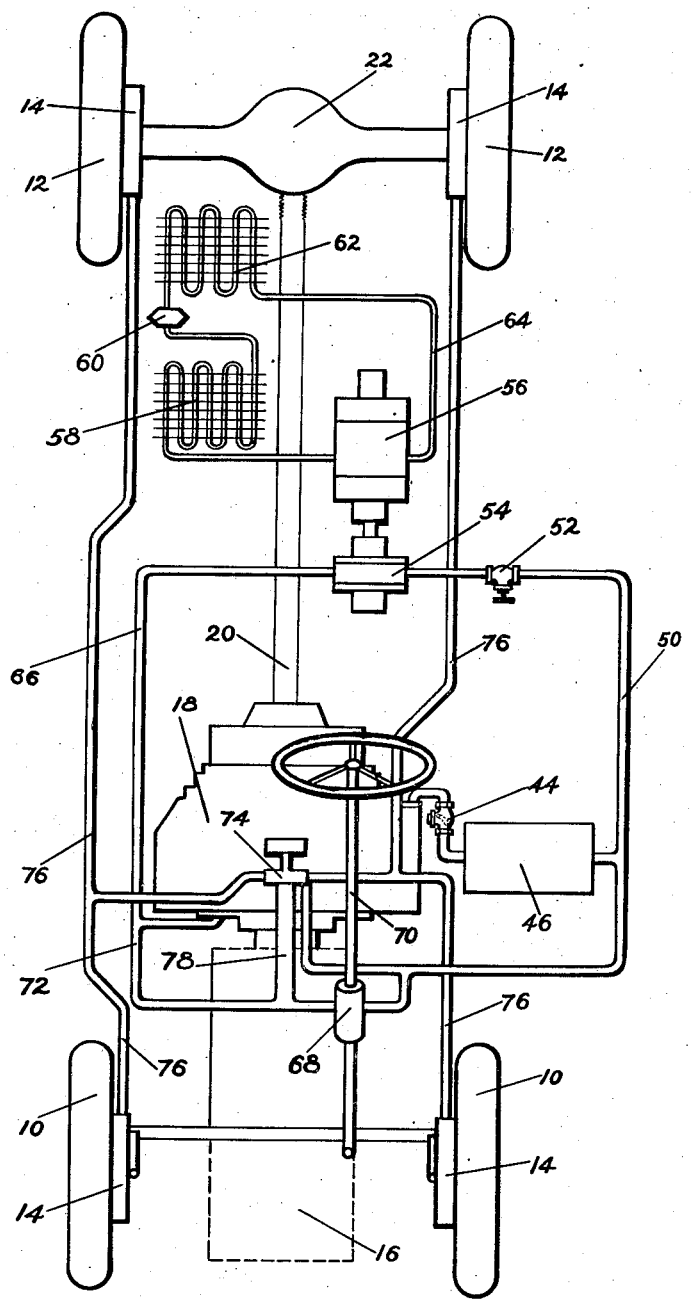
Figure 2:
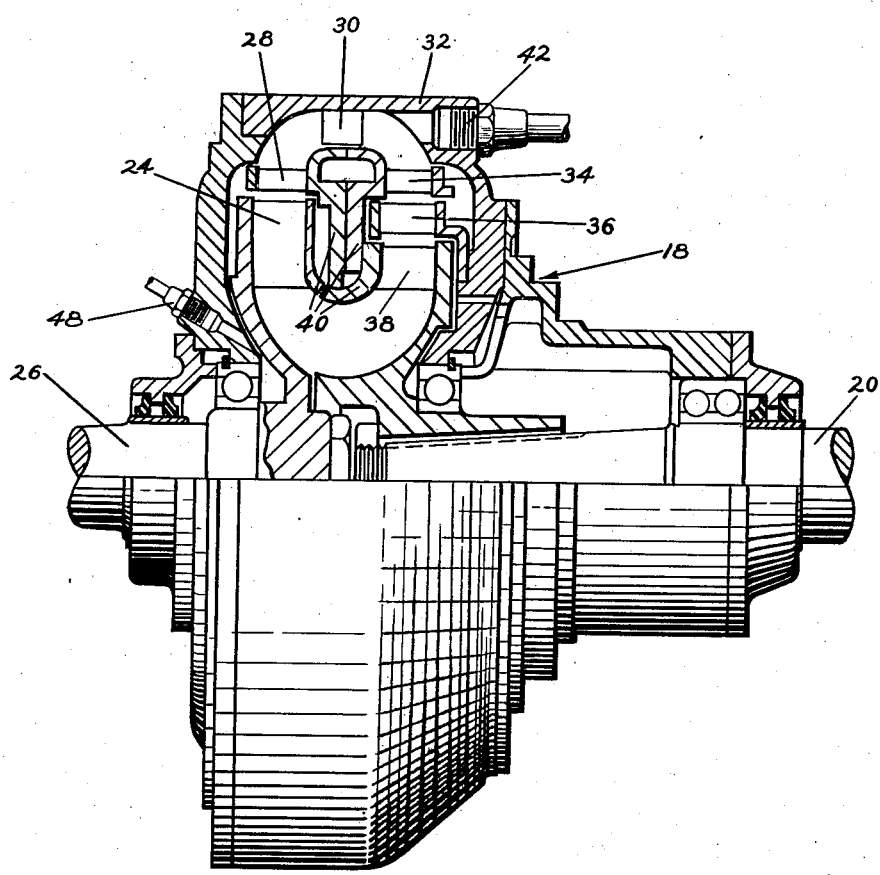

The above and other objects and features of the invention will be apparent from the following description of the illustrative embodiment shown in the accompanying drawings, in which:

Figure 1 is a diagrammatic plan view of an automobile embodying the invention; and Fig. 2 is a view of the hydraulic torque converter, partly in side elevation and partly in vertical longitudinal section.

The automobile illustrated in Figure 1 comprises a suitable body and frame structure (not shown) supported on front and rear road wheels 10 and 12 having hydraulically operated brakes 14. The automobile is driven by an internal combustion engine 16, acting through a hydraulic drive device 18 of the Fottinger type and through a propeller shaft 20 and rear axle 22 to drive the rear wheels 12.

The hydraulic drive device 18, of the Fottinger type (i. e., having an operating liquid centrifugally driven in a toroidal path), is preferably a hydraulic torque converter. The particular drive illustrated comprises a vaned impeller 24 on the engine-driven shaft 26. The liquid is driven by the impeller centrifugally against the vanes of a first-stage turbine 28, thence between guide vanes 30 carried by the stationary housing 32 to correct its direction of flow, thence against the vanes of a second-stage turbine 34, thence between a second set of guide vanes 36 carried by the housing 32, and finally against the vanes of a third-stage turbine 38. The three stages of the turbine are connected by shroud members 40, and the third-stage vanes 38, to a sleeve drivably secured to the end of the propeller shaft 20.

The shroud members 40, with a shroud ring on the inner side of the impeller 24 and one on the guide vanes 36, form a central composite ring about which the oil or other liquid is driven centrifugally in a toroidal path to impinge upon the three stages of the turbine to drive the propeller shaft 20. In light vehicles fewer stages will be required, and other forms of Fottinger type hydraulic drives may be substituted for the one shown.

In the Fottinger drive shown, and in equivalent Fottinger drives which may be used, there is a zone at the periphery in which the operating liquid is normally centrifugally maintained at a relatively high pressure, and a zone adjacent the axis where the liquid is at a much lower pressure. In the illustrated torque converter, a take-off passage 42 in the peripheral high pressure zone communicates through a check valve or equivalent one-way control device 44 with an accumulator 46. After driving the auxiliary mechanisms described below, the liquid is returned through a passage 48 to the axial low-pressure zone.

The accumulator 46 may be of any usual type, in which the liquid is stored under yielding pressure supplied by compressing the air in the upper part of the accumulator, or by a spring-pressed piston. Whenever the pressure at the outlet opening 42 exceeds that in the accumulator 46, liquid will be forced past the one-way check valve 44 into the accumulator 46.

A number of auxiliary mechanisms may be driven by pressure fluid from the accumulator 46. Some of the liquid under pressure in the accumulator flows therefrom through a conduit 50, and a suitable manual or automatic control valve 52, to drive a hydraulic motor 54, which in turn drives the compressor 56 of an air-conditioning system. Compressed gas passes from the compressor 56 to a condenser 58, where it is liquefied by cooling, thence through an expansion valve 60 to an expansion coil 62, where it performs its cooling function, and finally by way of a conduit 64 back to the compressor 56. The liquid from the outlet of the hydraulic motor 54 passes by a conduit 66 back to the return opening 48 of the torque converter. The hydraulic motor 54 may be of the construction described in my application No. 487,953, filed May 21, 1943. The accumulator 46 also supplies liquid under pressure to the hydraulic motor 68 of a hydraulic power steering gear 70, which may be as described in Davis Patent No. 1,937,485, granted November 28, 1933. The used liquid is returned by a conduit 72 to the low-pressure zone in the torque converter.

Liquid under pressure, from the accumulator 46, also passes to a treadle-controlled brake valve 74, substantially of the construction and arrangement fully described in an application Serial No. 489,043, filed May 29, 1943, by Erwin F. Loweke. The liquid metered by this valve communicates by conduits 76 with the brakes 14. Used liquid is returned to the low-pressure zone of the torque converter by a conduit 78.

In operation, liquid is forced under centrifugally-provided pressure from the opening 42 past the check valve 44 into the accumulator 46, where it is held under pressure until required. Pressure liquid from the accumulator is utilized to drive the air-conditioning system, to apply the brakes, to actuate the steering mechanism, or to operate any other auxiliary mechanism which may be provided. Used liquid is returned to the low-pressure zone of the torque converter.

While one particular embodiment has been described in detail, it is not my intention to limit the scope of the invention to that particular embodiment, or otherwise than by the terms of the appended claims.

I claim:

1. A vehicle having road wheels and driving means associated therewith including an engine and a hydraulic drive device of the Fottinger type containing an operating liquid through the medium of which the engine drives at least some of said wheels, said drive device having a zone near its periphery in which the power of the engine normally maintains said liquid under a considerable centrifugal pressure and another zone near its axis in which the liquid is at a very much lower pressure, a liquid power accumulator having therein liquid under yielding pressure is connected to said peripheral zone through connections including a one-way check device through which liquid is forced when the pressure in said peripheral zone is above the pressure in the accumulator, auxiliary mechanism operated by liquid under pressure fed thereto from said accumulator, and means for returning liquid to said axial zone after use in said auxiliary mechanism.

2. A vehicle having road wheels and driving means associated therewith including an engine and a hydraulic torque converter containing an operating liquid and through the medium of the engine drives at least some of said wheels, said torque converter having a zone near its periphery in which the power of the engine normally maintains said liquid under a considerable centrifugal pressure and another zone near its axis in which the liquid is at a very much lower pressure, a liquid power accumulator having therein liquid under yielding pressure is connected to said peripheral zone through connections including a one-way check device through which liquid is forced when the pressure in said peripheral zone is above the pressure in the accumulator, auxiliary mechanism operated by liquid under pressure fed thereto from said accumulator, and means for returning liquid to said axial zone after use in said auxiliary mechanism.

3. A vehicle having driving mechanism comprising an engine-driven hydraulic drive device of the Fottinger type containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic drive device.

4. A vehicle having driving mechanism comprising an engine-driven hydraulic torque converter containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic torque converter.

5. A vehicle having driving mechanism comprising an engine-driven hydraulic drive device of the Fottinger type containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic drive device, said auxiliary mechanism comprising an air conditioning system including a motor which operates the system and which is driven by said liquid.

6. A vehicle having driving mechanism comprising an engine-driven hydraulic torque converter containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic torque converter, said auxiliary mechanism comprising an air conditioning system including a motor which operates the system and which is driven by said liquid.

7. A vehicle having driving mechanism comprising an engine-driven hydraulic drive device of the Fottinger type containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic drive device, said auxiliary mechanism comprising a system of brakes for controlling the vehicle.

8. A vehicle having driving mechanism comprising an engine-driven hydraulic torque converter containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic torque converter, said auxiliary mechanism comprising a system of brakes for controlling the vehicle.

9. A vehicle having driving mechanism comprising an engine-driven hydraulic drive device of the Fottinger type containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic drive device, said auxiliary mechanism comprising a hydraulic steering gear for steering the vehicle.

10. A vehicle having driving mechanism comprising an engine-driven hydraulic torque converter containing an operating liquid normally maintained at a considerable centrifugal pressure in a peripheral zone and at a much lower pressure in a zone near the axis, an auxiliary mechanism, means for operating said mechanism by liquid under pressure withdrawn from said peripheral zone, and means for returning used liquid from said mechanism to said axial zone in the hydraulic torque converter, said auxiliary mechanism comprising a hydraulic steering gear for steering the vehicle.

ANDREW A. KUCHER.